March 12, 1968
J. H. BIRDWELL
3,372,540
APPARATUS FOR PREVENTING DISCHARGE OF CONTAMINANTS FROM
THE ENGINE OF AN AUTOMOTIVE VEHICLE
Filed June 27, 1966
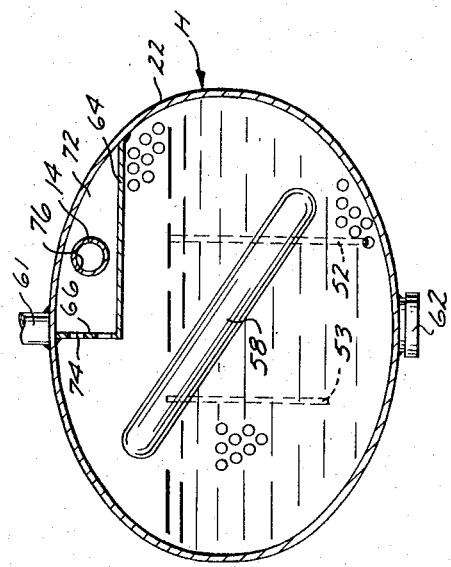
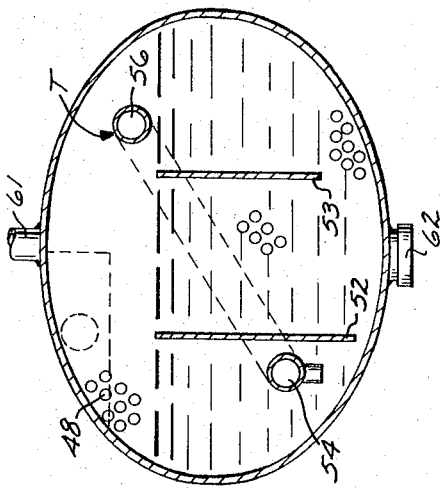
INVENTOR.
JESS H. BIRDWELL
BY Fulwider, Patton, Rieker,
Lee and Utecht
ATTORNEYS

United States Patent Office 3,372,540
Patented Mar. 12, 1968

3,372,540
APPARATUS FOR PREVENTING DISCHARGE OF CONTAMINANTS FROM THE ENGINE OF AN AUTOMOTIVE VEHICLE
Jess H. Birdwell, 5476 Linden Ave., Apt. 7, Long Beach, Calif. 90805
Filed June 27, 1966, Ser. No. 560,496
7 Claims. (Cl. 60—30)

The present invention relates generally to automotive vehicles and more particularly to novel apparatus for preventing the discharge of contaminants therefrom into the atmosphere.

It is well known that the discharge of exhaust contaminants from the internal combustion engines of automotive vehicles creates serious problems in the larger population centers. Such contaminants endanger the health of the populace, as well as creating an unpleasant and uncomfortable atmosphere in which to live and work. These contaminants also have an adverse effect on crops and on all animate and many inanimate objects.

While many devices have been heretofore proposed for preventing the discharge of these contaminants into the atmosphere, none have received general acceptance in actual use. Such devices, even though expensive and complex, have failed to adequately eliminate the discharge of internal combustion engine contaminants into the atmosphere.

It is a major object of the present invention to provide apparatus for preventing the discharge of exhaust gas contaminants from the internal combustion engines of automotive vehicles into the atmosphere.

Another object of the present invention is to provide apparatus of the aforedescribed nature which is completely foolproof in operation and will provide a long and trouble-free service life.

An additional object of the present invention is to provide apparatus of the aforedescribed nature that is extremely simple in design utilizing no moving parts.

A further object of the present invention is to provide apparatus of the aforedescribed nature capable of preventing any and all discharge of such contaminants.

Yet another object of the present invention is to provide apparatus of the aforedescribed nature that readily lends itself to installation on existing automotive vehicles or alternatively may be installed on new vehicles.

More particularly, it is an object of the present invention to provide apparatus of the aforedescribed nature utilizing a housing through which extends an exhaust gas tube. The housing is partially filled with water, with the discharge or the exhaust gas pipe being above the water level. An injector tube interconnects the body of water and the exhaust tube whereby the flow of hot exhaust gases through the pipe inducts a stream of water into such pipe. The water so induced into the exhaust gas pipe flashes into steam and the mixture of steam and exhaust gases discharge within the housing above the water level therein. The exhaust gas contaminants are trapped within the housing, with the remaining exhaust gas discharging from the housing through a tailpipe.

These and other objects and advantages of the present invention will become apparent from the following detailed description, when taken in conjunction with the appended drawings, wherein:

FIGURE 1 is a sectional view of a preferred form of apparatus embodying the present invention taken on line 1—1 of FIG. 2;

FIG. 2 is a vertical sectional view taken on line 2—2 of FIG. 1; and

FIG. 3 is a vertical sectional view taken on line 3—3 of FIG. 1.

Referring to the drawings, a preferred form of apparatus embodying the present invention includes a housing H fabricated of metal in a conventional manner. An exhaust tube T extends through the housing H. The exhaust tube T conducts exhaust gases from an automotive vehicle internal combustion engine (not shown) in the manner indicated by the directional arrows in FIG. 1. The interior of the housing H contains a body of water 10. The discharge end 12 of the exhaust tube T is normally arranged above the level 12 of the body of water 10. A tailpipe 14 conducts gases out of the housing H.

More particularly, the housing H may be of typical muffler construction having a generally elliptical vertical cross section. The housing H includes a plurality of vertically-extending, longitudinally-spaced, transverse baffles 38, 40, 42, 44, and 46. Each of these baffles is formed over its surface with apertures 48. As indicated particularly in FIG. 1, these baffles are also formed with horizontally-aligned upper and lower bores 50 and 51 through which the exhaust tube T extends, such tube being rigidly secured to the walls of the baffle bores, as by welding. Housing H also includes vertical baffles 52 and 53 that extend longitudinally therethrough. Baffles 52 and 53 are not shown in FIG. 1 in the interest of clarity.

The exhaust tube T includes a lower horizontal run 54 and an upper horizontal run 56, such runs being horizontally offset as indicated particularly in FIGS. 2 and 3. The runs 54 and 56 are interconnected by a bend 58. The discharge 12 of the exhaust tube T faces forwardly and is positioned intermediate the front end of the housing H and the forwardly-facing surface of the front baffle 48. An induction tube 60 is disposed at the lower front portion of the exhaust tube T. This induction tube extends downwardly and forwardly relative to the exhaust tube T. If desired, induction tube 60 may incorporate a venturi.

Housing 10 is provided with a suitable filler conduit 61 leading to a capped fitting (not shown) of conventional construction. The bottom of housing H is provided with a conventional drain 62 disposed below tube 60.

The upper rear portion of the housing H is provided with a gas collection chamber 63. The gas collection chamber 63 is defined by a horizontal wall 64 having one end rigidly affixed to one side of the upper section 22 of housing H. The inner edge of such wall is bent upwardly to define a vertical wall 66, as indicated particularly in FIG. 3. A front wall 68 is connected to the front of the bottom and sidewalls 64 and 66, respectively. A pair of vertical spacer plates 70 and 72 are arranged within the intermediate portion of the gas collection chamber 72. The side and front walls 66 and 68, respectively, are fomed with apertures 74 forwardly of the ront spacer 70. Spacers 70 and 72 are formed with bores 76 that receive the front portion of the tailpipe 14, with such tailpipe being rigidly affixed within these bores as by welding. The tailpipe 14 is also rigidly affixed as by welding to the rear wall of the upper housing section 22.

In the operation of the aforedescribed apparatus, hot exhaust gases enter the front of the exhaust tube T from an internal combustion engine (not shown) at considerable velocity. These hot exhaust gases induce the flow of water through induction tube 60 into the exhaust tube T. Such water immediately flashes into steam so as to generally saturate the exhaust gases. The unconsumed products of combustion in the exhaust gas are thoroughly mixed with the water vapor. The rapid expansion of water entering induction tube 60 effects a reduction in temperature of the exhaust gases. The mixture of exhaust gases and water vapor is discharged from the front end of the exhaust tube.

It has been determined that the unburned exhaust gas contaminants will be trapped within the housing H and only purified gases will enter the gas collection chamber 63 to be discharged through tailpipe 14, together with a small amount of water vapor. A balance of the water 10 is maintained within the housing H since most of the steam formed within exhaust tube T is condensed. Additionally, a certain amount of water vapor is present in the exhaust gases. The longitudinally-spaced baffles as well as the longitudinally-extending baffles inhibit excessive water motion within the housing. The longitudinally-extending baffle 52 additionally restrains the entrance of any solid particles through the induction tube 60.

It is desirable to drain the water 10 and flush the interior of the housing H periodically. The draining and refilling is readily accomplished by means of the filler tube 61 and the drain 62. It is also desirable to provide the interior surface of the housing H with a smooth non-corrosive and heat-conducting medium such as Teflon or the like. Positioning of drain 62 below the induction tube 62 affords ready access to the latter for cleaning.

The aforedescribed apparatus does not substantially increase the back pressure of an internal combustion engine. The housing H may replace the conventional internal combustion muffler. It would be apparent that the simple design of the apparatus of the present invention insures a minimum of maintenance and a long, trouble-free service life.

Various modifications and changes may be made with respect to the foregoing detailed description without departing from the spirit of the present invention or the scope of the following claims.

I claim:
1. Apparatus for preventing discharge of exhaust gas contaminants from an internal combustion engine, comprising:
   a housing;
   a body of water in said housing;
   an exhaust gas tube extending through said housing, the discharge end of said exhaust gas tube normally being arranged above the level of said body of water;
   an induction tube positioned on a submerged portion of said exhaust gas tube whereby flow of exhaust gas through said exhaust gas tube will induce the flow of water into said exhaust gas tube; and
   a tailpipe extending from said housing above the level of said body of water.

2. Apparatus as set forth in claim 1 wherein the lower portion of said housing is provided with a water drain adjacent said induction tube.

3. Apparatus as set forth in claim 1 wherein said exhaust gas tube includes a rearwardly-extending lower horizontal run and a forwardly-extending upper horizontal run interconnected by a bend, with the front end of said upper run defining the discharge of said exhaust gas tube, and with said induction tube being positioned in the front portion of said lower run.

4. Apparatus as set forth in claim 1 wherein said housing is formed with baffle means that inhibit excessive water motion.

5. Apparatus as set forth in claim 2 wherein said exhaust gas tube includes a rearwardly-extending lower horizontal run and a forwardly-extending upper horizontal run interconnected by a bend, with the front end of said upper run defining the discharge of said exhaust gas tube, and with said induction tube being positioned in the front portion of said lower run.

6. Apparatus as set forth in claim 2 wherein said housing is formed with baffle means that inhibit excessive water motion.

7. Apparatus as set forth in claim 3 wherein said housing is formed with baffle means that inhibit excessive water motion.

References Cited

UNITED STATES PATENTS

| 1,478,948 | 12/1923 | Gara | 60—31 |
| 2,777,536 | 1/1957 | Thomas | 60—30 X |
| 2,862,354 | 12/1958 | Barnhart | 60—30 |

FOREIGN PATENTS

| 101,104 | 6/1906 | Germany. |

RALPH D. BLAKESLEE, *Primary Examiner.*